United States Patent
Aguilar Mendez et al.

(10) Patent No.: US 10,107,047 B2
(45) Date of Patent: Oct. 23, 2018

(54) CONNECTION PROTECTOR WITH A FLEXIBLE GASKET FOR A TUBULAR COMPONENT

(71) Applicant: VALLOUREC OIL AND GAS FRANCE, Aulnoye-Aymeries (FR)

(72) Inventors: Jose Antonio Aguilar Mendez, Veracruz (MX); Gerardo Manuel Magallanes Montalvo, Veracruz (MX); Karim Bousbaine, Badevel (FR)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 0 days.

(21) Appl. No.: 15/536,717

(22) PCT Filed: Dec. 18, 2015

(86) PCT No.: PCT/FR2015/053631
§ 371 (c)(1),
(2) Date: Jun. 16, 2017

(87) PCT Pub. No.: WO2016/102846
PCT Pub. Date: Jun. 30, 2016

(65) Prior Publication Data
US 2017/0370159 A1 Dec. 28, 2017

(30) Foreign Application Priority Data
Dec. 22, 2014 (FR) .................................. 14 63080

(51) Int. Cl.
*E21B 17/00* (2006.01)
*F16L 57/00* (2006.01)
(Continued)

(52) U.S. Cl.
CPC ............ *E21B 17/006* (2013.01); *B65D 59/06* (2013.01); *F16L 57/005* (2013.01); *F16L 58/182* (2013.01);
(Continued)

(58) Field of Classification Search
CPC combination set(s) only.
See application file for complete search history.

(56) References Cited

U.S. PATENT DOCUMENTS 1,756,167 A * 4/1930 Avery .................... B65D 59/00
138/96 T
2,316,013 A * 4/1943 Mulholland ........... B65D 59/02
138/96 T
(Continued)

OTHER PUBLICATIONS

International Search Report dated Mar. 11, 2016 in PCT/FR2015/053631 filed Dec. 18, 2015.

*Primary Examiner* — Kyle Armstrong
(74) *Attorney, Agent, or Firm* — Oblon, McClelland, Maier & Neustadt, L.L.P.

(57) ABSTRACT

A protector for a connection for a tubular component for drilling or operating hydrocarbon wells, provided with a distal end surface, the protector comprising an annular housing comprising a bottom, two lateral walls, outer and inner, separated from each other and in which an annular gasket is disposed, each lateral wall comprising a bottom lateral wall portion and an exterior lateral wall portion and an upper face, the two exterior lateral wall portions defining an opening with width $A_u$ and characterized in that a distance A between two bottom lateral wall portions is greater than the width $A_u$, in a manner such as to allow a first annular gasket to be positioned then to allow said annular gasket to be retained in the annular housing.

12 Claims, 3 Drawing Sheets

Figure 1:
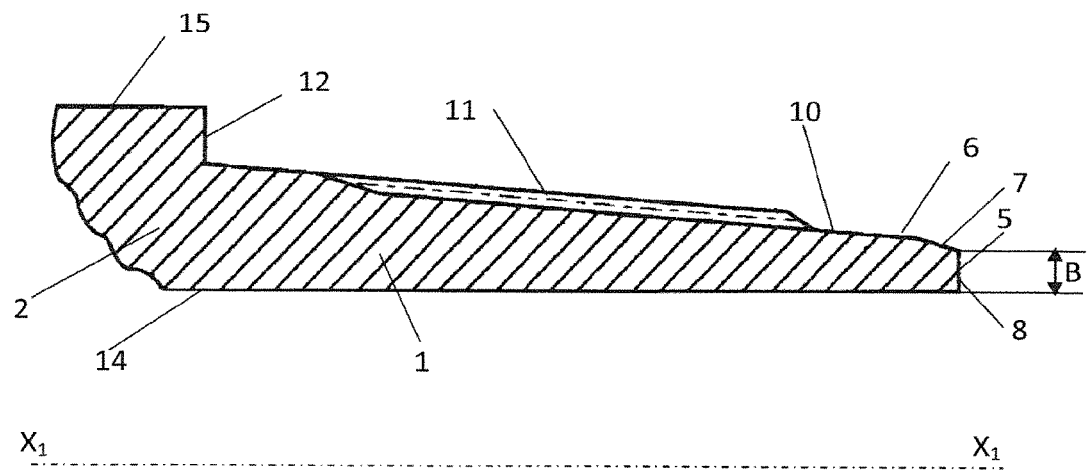

(51) Int. Cl.
 *B65D 59/06* (2006.01)
 *F16L 58/18* (2006.01)
 E21B 17/042 (2006.01)
 E21B 17/10 (2006.01)

(52) U.S. Cl.
 CPC ......... *E21B 17/042* (2013.01); *E21B 17/1035* (2013.01); *E21B 17/1085* (2013.01)

(56) References Cited

U.S. PATENT DOCUMENTS

| | | | | |
|---|---|---|---|---|
| 4,157,100 | A | | 6/1979 | Turk |
| 4,337,799 | A | * | 7/1982 | Hoover ................. F16L 57/005 138/89 |
| 4,429,719 | A | | 2/1984 | Mosing |
| 4,719,687 | A | | 1/1988 | Nanny |
| 5,850,854 | A | * | 12/1998 | Carroll ................. F16L 55/115 138/158 |
| 7,284,770 | B2 | * | 10/2007 | Dell'erba ............... B65D 59/06 138/96 T |
| 8,011,391 | B2 | * | 9/2011 | Heritier ................ F16L 57/005 138/96 R |
| 2005/0166986 | A1 | * | 8/2005 | Dell'erba ............... B65D 59/06 138/96 T |

\* cited by examiner

CONNECTION PROTECTOR WITH A FLEXIBLE GASKET FOR A TUBULAR COMPONENT

The invention relates to tubular threaded components and more precisely to protectors for the ends of certain of these components, in particular tubulars for drilling or operating oil or gas wells.

The term "component" as used here means any element or accessory used to drill or operate a well and comprising at least one connection or connector or indeed threaded end, and intended to be coupled via a threading to another component in order to constitute a threaded tubular connection with this other component. The component may, for example, be a relatively great length tubular element (in particular approximately ten meters in length), for example a tubular, or a tubular coupling several tens of centimeters in length, or indeed an accessory for these tubular elements (a hanger, a cross-over, a safety valve, a tool gasket, sub or the like).

The components are generally connected one to another for dropping into the hydrocarbon wells or similar wells and to constitute a drill stem, a casing string or liner string or indeed a tubing string (operating columns).

Specification API 5 CT issued by the American Petroleum Institute (API), equivalent to ISO 11960:2004 issued by the International Standardisation Organisation (ISO), governs tubulars used as casing or tubing, and specification API 5B defines the standard threadings for these tubulars.

Specification 7 from the API defines threaded connections with a shoulder for rotary drill pipes.

The manufacturers of threaded tubular connection components have also developed threaded connections which are termed "premium" threaded connections the threadings of which have specific geometries, and specific means which endow them with better performances in service, in particular in the matter of mechanical strength and sealing.

The threaded connections usually include one or two threadings the threads of which are substantially trapezoidal and comprise a stabbing flank on the side of the threads directed towards the free end of the threaded element under consideration, a load flank on the side opposite to the stabbing threads, a thread crest with a non-zero width and a thread root, also with a non-zero width, the load flanks and the stabbing flanks having an orientation substantially perpendicular to the axis of the threaded element (for example, the API Buttress thread complying with the API standard has an inclination of +3° for the load flanks, and an inclination of +10° for the stabbing flanks).

Triangular or round threads also exist, also having stabbing flanks and load flanks the thread crests and roots of which have a substantially zero width; however, these are not now used much as they run a great risk of jump-out.

The components mentioned above may comprise a male threaded end which is intended to be made up into a threaded female end of another drilling or operating component. Thus, it is vital that their male and female ends are damaged or contaminated or deteriorate to the least possible extent between the time they leave their production line and that at which they are used, but also between two successive uses. It will be understood that it is in fact necessary to protect not only the threading but also any sealing surface(s) and abutment(s) against corrosion, dust and shock (or knocks); each of these components has specific and complementary functions, in particular with a view to ensuring a seal when being used.

Furthermore, the ends of the components mentioned above were generally coated just before coupling, using an appropriate grease with anti-galling properties.

Replacing this grease with a combination of surface treatments and coatings applied in thin layers on the connections, i.e. on the threading, the sealing surface or the abutment, is becoming more and more routine.

As an example, U.S. Pat. No. 6,027,145, EP 1 211 451 and FR 2 892 174 in particular have proposed replacing the grease, which is applied to the end of the component using a brush, with a thin layer having a predetermined thickness of a dry lubricant based on particles of solid lubricants, applied at the factory.

These surface treatments and coatings have hardness properties, lubrication properties, anticorrosion properties which are adapted to the operational circumstances of coupling two connections or to the coupled condition, and it is necessary to adapt the protectors of the connection when the product is not in these circumstances, particularly during storage, handling and transport, in order to preserve the connection against mechanical removal and against contamination (sand, debris) which can be prejudicial to the efficiency of the product.

The coatings are also known as lubricating coatings and classified as dry or semi-dry solids or semi-solids. They have viscosity properties which are spread over a very wide range, from 500 mPa·s at 25° C. to more than 5000 mPa·s at 25° C., and some are even classified as "adhesives", i.e. after application to the surfaces of the connection, they could adhere to any object which touches them, and in particular may migrate to the fingers of an operator touching the coated surface of the connection. In contrast, others are classified as being rigid and have a certain hardness. These are desirable properties for facilitating connecting of two connections, but they give rise to problems with the protectors for the connections. These in fact have to protect the connections against shocks, they have to be firmly secured to the connection and they must have rigid bodies.

In order to obtain this protection, in general, and as required by the specification API 5 CT (in paragraph 12.2), a protector is placed on the male and female ends of the components of the threaded tubular connections. A large number of devices of this type have been proposed, in particular in EP 0 148 807, US 2006/0042709, WO 2005/075877 and WO 2005/024282, the last three documents being more particularly aimed at protectors for connections which have already been coated with lubricant at the factory. It has been demonstrated that some of them run the risk of damaging the protective device when being put in position, and have an insufficient seal against air and humidity.

Protectors are devices with the principal function of protecting the functional surfaces of male or female connections against mechanical shocks. These surfaces may be one or more threading(s), one or more sealing surfaces, or one or more abutment(s). A protector generally has a substantially cylindrical shape and generally includes cushioning against mechanical shocks known as a shock absorber located at the end opposite to the free end of the protector, and a body, and a securing means. The solution generally adapted for securing a protector on a connection is to screw it onto the threading of the connection. This solution means that a simple action is associated with precise positioning. Thus, the protector comprises a threading which is capable of being screwed onto the threading of the connection. The threading is usually of the same type and pitch as that of the connection.

In addition, with the appearance of surface treatments and coatings applied to the connections, protectors have been provided with sealing means in order to reinforce the seal against moisture or air of regions comprising the functional surfaces of a connection. These sealing means are generally associated with the protector and are produced in shapes and materials which provide them with increased flexibility compared with the very rigid body of the protector, so that a portion of their surface makes contact with a surface of the facing connection with a view to producing a sealing contact.

However, the Applicant has noticed that the known solutions cannot be used to establish a satisfactory seal against water.

Document U.S. Pat. No. 7,284,770 provides a protector comprising two gaskets mounted on the body of the protector; they are of different materials, in particular having lower hardness than that of the body of the protector, for example produced from elastomers; and they produce a seal at two distinct locations, a first seal at the distal end of the tubular component and a second seal on a lateral surface of the tubular component. These two gaskets in combination with the body of the protector mean that when the protector is mounted on an end portion of the component, a zone which is sealed against air or humidity or dust is obtained. When screwed up, the annular surface of the distal end makes contact with both an annular gasket and a portion of the body of the protector. This solution means that a portion of the end of the component will come into abutment with the body of the protector, the rigidity of which is higher than that of the material of the gasket, and which will limit the force and torque exerted on the gasket. The Applicant has demonstrated that the seal at the distal end of the annular component could be compromised, in particular because the connection is not maintained in position in a suitable manner. In fact, when the protector is being screwed onto one end of the component, the annular gasket could be displaced and twisted and could no longer carry out its sealing function. The gasket may also be lost during manipulation of the protector itself.

The Applicant has determined that the situation could be improved by preventing improper displacement of the annular gasket when the protector is being screwed onto the component and by improving the quality of the seal generated in contact between the annular gasket and the distal annular end of a connection.

In one aspect, the invention allows for an annular gasket to be positioned in a housing and reduces the risk of this gasket becoming completely or partially dislodged, accidentally during manipulation of the protector or indeed under the effect of the torque applied by a connection to the gasket when the protector is being screwed onto a connection.

In addition, the invention can be used to reduce the risk of pollution of the connection by an annular gasket of the protector, preventing said gasket or a portion of said gasket from staying stuck to the connection after removal of the protector. In fact, the tubular components are stored over a period of time with the protector in position on the end of the component. A portion of the gasket could become stuck to the surface of the end with which it is in contact, which could then contaminate the functional surface of the end of the component.

In a further aspect, the invention proposes a solution which improves the seal provided by an annular gasket on a distal annular surface by proposing an annular gasket with a width which is larger than the width of the distal end. Thus, the distal end of the component is exclusively in contact with the annular gasket. This means that the reliability of the seal which is generated can be improved, and also that the robustness of the clamping torque of the protector on the connection due to friction between the distal end of the component and the annular gasket can be improved.

In another aspect, the invention proposes a sealing means which is static in its housing when the protector is being positioned on the end of the component, in particular an annular sealing gasket wherein rotation in its housing is prevented when the protector has been completely screwed onto the component when an annular end surface exerts a torque on said sealing gasket.

In another aspect, the invention proposes a housing for the end gasket which prevents torsion of the gasket during positioning of the protector on the end of the component.

The aim of the invention is to improve the situation, in particular in terms of simplicity of implementation and robustness, while obtaining a quality seal and allowing the possibility of inspection.

The present invention provides a connection protector for a tubular component for drilling or operating hydrocarbon wells, provided with a distal end surface, the protector comprising an annular housing comprising a bottom, two lateral walls, outer and inner, separated from each other and in which an annular gasket is disposed, each lateral wall comprising a bottom lateral wall portion and an exterior lateral wall portion and an upper face, the two exterior lateral wall portions defining an opening with width $A_u$ and characterized in that a distance A between two bottom lateral wall portions is greater than the width $A_u$, in a manner such as to allow a first annular gasket to be positioned then to allow said annular gasket to be retained in the annular housing.

In one embodiment, the distal end surface has a width B and the width $A_u$ is greater than the width B in a manner such that when screwed on, the annular end surface of the connection is in contact with the first annular gasket only.

In one embodiment, the annular gasket comprises at least one notch which is capable of cooperating with at least one set-back formed in the annular housing.

In one embodiment, the annular gasket comprises a plurality of notches distributed over the circumference of said annular gasket and the annular housing comprises a plurality of set-backs which are capable of cooperating with said notches.

In one embodiment, the annular gasket comprises an inner face, an outer face and a lower face and at least one notch is on the inner face (37) or on the outer face or on the lower face.

In one embodiment, a notch has a V-shaped or U-shaped contour.

In one embodiment, the annular gasket comprises an upper face which is substantially planar or conical or concave or convex and has an elevation with a height which is less than ¼ of the mean height of the annular gasket.

In one embodiment, the protector comprises a second sealing device intended to form a seal with an exterior lateral wall of the component.

In one embodiment, the shape of the bottom is planar or is in the form of a portion of a toroid enveloping the lower face.

In one embodiment, the bottom comprises at least one recess for facilitating the removal and replacement of an annular gasket by an operator.

In one embodiment, the annular gasket is formed from an elastomeric material with a hardness in the range 30 to 60 Shore A.

In accordance with a further aspect, the invention provides a threaded tubular connection component for drilling or operating hydrocarbon wells, comprising a connection provided with at least one threading and comprising an annular end surface, said component being equipped with a protector, screwed onto said threading of said tubular component.

In one embodiment, the annular end surface is in contact with the annular gasket only.

The term "male connection" means the portion of a component provided with machined and/or machine-ground surfaces intended to form a connection with a corresponding female portion, and the term "body" means the remaining portion of a component provided with surfaces which have been rolled. A male connection generally has one or more threading(s) located on an exterior lateral wall and a corresponding female connection has one or more corresponding threading(s) on an interior lateral wall of the component.

For the purposes of simplification, the invention will now be represented by embodiments of a protector for a male connection. However, the present invention is entirely suitable for a protector for a female connection, and protection should not be limited to male connections alone.

Figure 2:
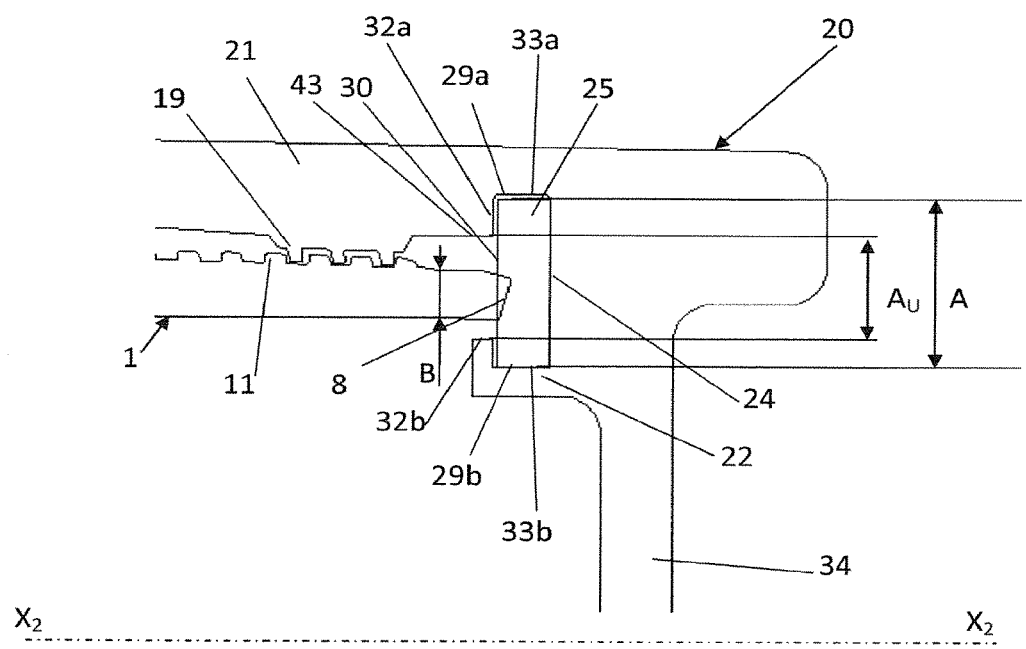
Figure 3:
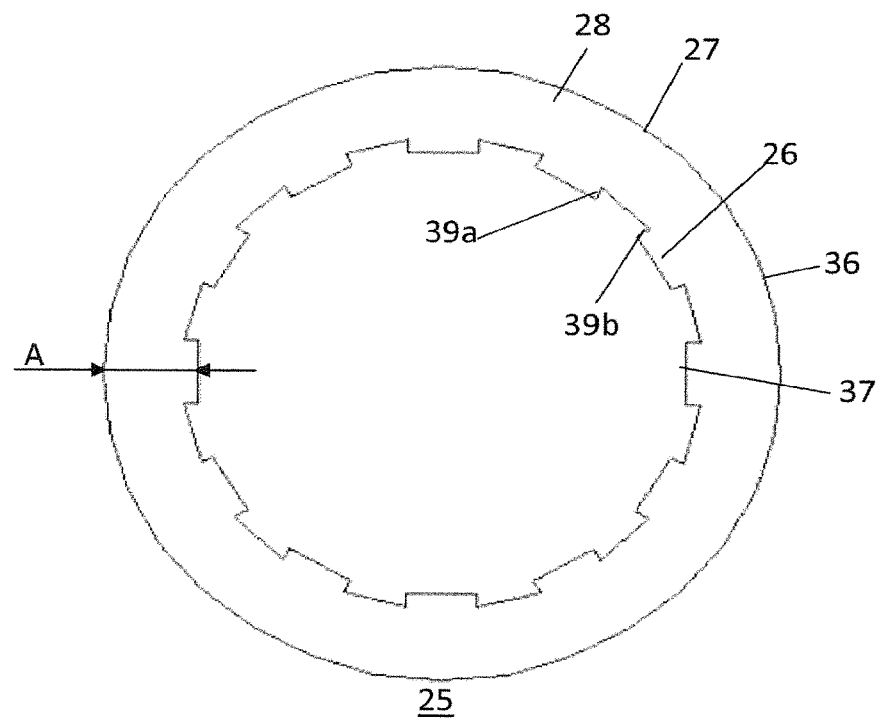
Figure 4:
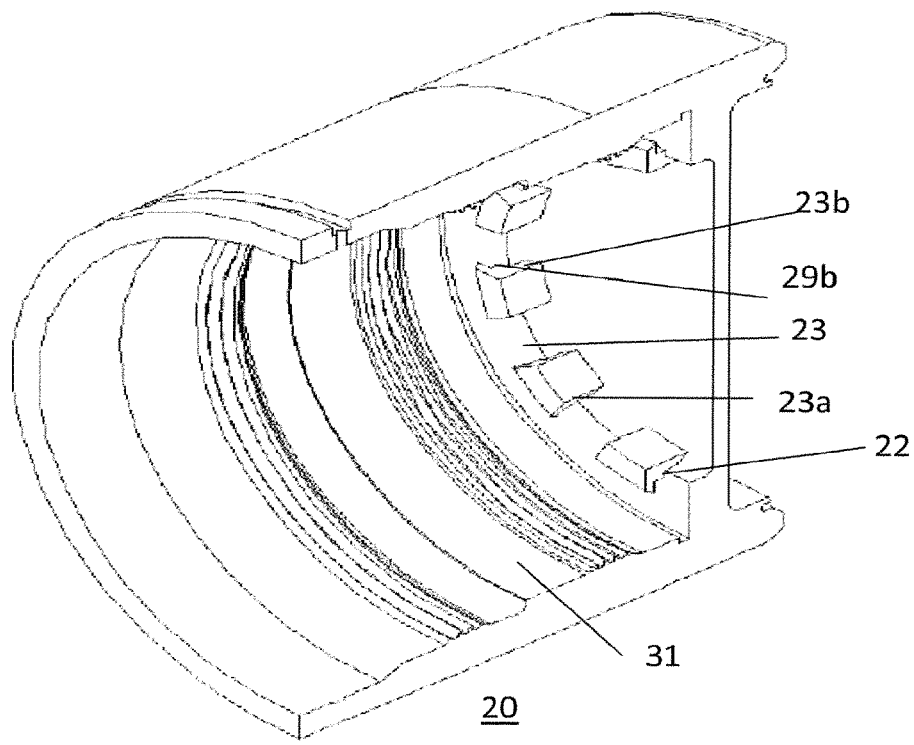
Figure 5:
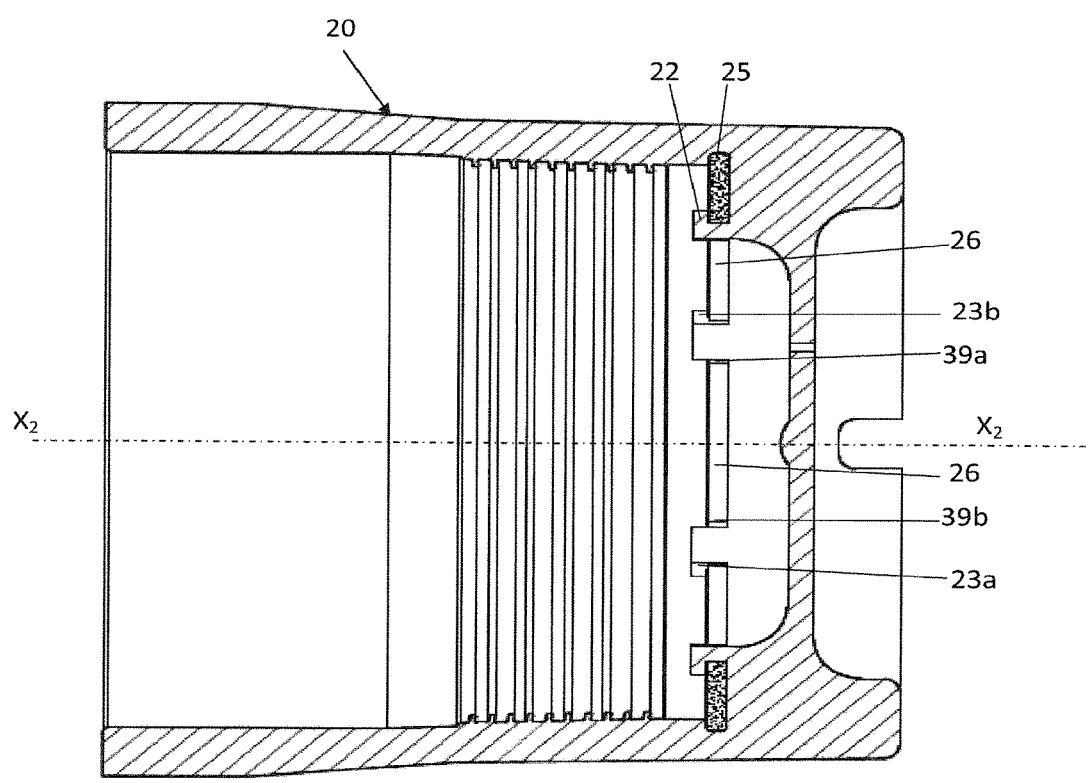

Further characteristics and advantages of the invention will become apparent from the following description and the accompanying drawings, in which:

FIG. 1 diagrammatically illustrates a sectional view of a connection of a tubular component, FIG. 2 diagrammatically illustrates a detailed sectional view of a connection of a tubular component and a protector in accordance with one embodiment of the invention, in the connected condition, FIG. 3 diagrammatically illustrates, in axial view, an annular gasket in accordance with one embodiment of the invention, FIG. 4 diagrammatically illustrates, in a partial perspective view, a protector body in accordance with one embodiment of the invention, FIG. 5 diagrammatically illustrates a sectional view of the same embodiment of a protector for a male end in accordance with the invention.

The accompanying drawings not only serve to complete the invention, but also contribute to its definition if appropriate. They do not limit the scope of the invention.

The invention is intended to improve the protection of the threaded end of a tubular component of a threaded tubular connection (intended for drilling or operating a hydrocarbon well or the like) against mechanical damage, contamination (chemical and equipment) and deterioration (corrosion) between the time it leaves its production line and the time when it is used (with several possible connecting and breaking-out operations for the protection device), but also between two successive uses, greatly minimizing the risks that an annular gasket which is capable of generating a seal with a distal annular surface of a tubular component, could be dislodged from its housing during manipulation of the protector or when the protector is being connected to the tubular component.

FIG. 1 represents a sectional view of a portion of a tubular component which comprises a tubular body (2) and at least one male connection (1). The male connection is generally produced by machining the tubular body. The tubular body comprises an exterior lateral wall (15) and an interior lateral wall (14). The male connection (1) of FIG. 1 has a principal axis $X_1$.

The male connection (1) comprises an outer threading (11) intended to be made up onto the female connection of another tubular component via the inner threading (not shown) of the corresponding female connection. The male connection (1) also comprises, on an outer lateral surface of the connection (10), an exterior annular surface (12), an interior annular surface (5), a sealing surface (6) and an interior lateral wall (14).

The male connection (1) of the component is terminated by a distal annular surface (5) with a substantially transverse orientation. This distal annular surface may be simple, planar, as represented in FIG. 1, and alternatively it may be non-planar, for example conical. Alternatively, it may be composed of two annular conical surfaces connected via an annular ridge or a fillet radius. One of the two annular conical surfaces may optionally be a sealing surface, connected directly to a second annular planar surface forming a link with the interior lateral wall (14).

More generally, the distal annular surface is the surface connecting the interior lateral wall (14) and the outer lateral connecting surface (10). The sealing surface (6) and the distal annular surface may be separated by a link portion (7). The distal annular surface may optionally comprise an abutment surface (8) which acts so as to bear on a corresponding surface of the corresponding female connection once connected, in order to create a sealing surface or to transmit a torque. A distal annular surface may have an axial length of a few millimeters, for example 0 to 4 mm.

The distal annular surface (5) of a male connection is an interior annular surface. The distal annular surface of a female connection is an exterior annular surface.

A distal end surface is an annular surface located downstream of the threading of a connection. A first element of a component is downstream of a second element of a component when the first element is axially positioned closer to the free end of the component. A first element of a component is upstream of a second element of a component when the first element is axially positioned further away from the free end of the component.

The distal annular surface has a radial width B. More precisely, in particular when the distal annular surface is not a simple surface but a combination of several surfaces, the width B is taken to be the difference between the smallest radius and the largest radius of the projection in a plane perpendicular to the axis $X_1$ of the surfaces constituting the distal annular surface. This projection is necessarily in the form of a ring having a smaller radius and a larger radius.

The width B may be defined as the width of the distal end face 8 if this is planar.

The exterior annular surface (12) of a connection may comprise an exterior abutment surface, an exterior bearing surface (also known as a sealing surface) and/or a linking surface between the zone comprising the outer threading (11) and the exterior lateral wall (15) of the tubular body (2).

A connection threading (11) may comprise perfect threads and vanishing or imperfect threads. In fact, when a threading is tapered, it may be subdivided into a portion which is said to have perfect threads with a profile which is constant and without irregularities or imperfections (for example of the burr type) and a portion which is said to have vanishing or imperfect threads the height of which decreases progressively and which has a profile which may have irregularities or imperfections in a manner such as to provide a clearance between the thread crests and roots. Imperfect threads are practically incapable of accommodating screwing forces because they do not come into contact with the surfaces of the threads of the mated portion.

A male connection (1) may also comprise one or more metal/metal sealing surfaces which correspond with sealing surfaces of a female connection (downstream of the threading, upstream of the thread or between two threaded portions). A male connection (1) may also comprise two exterior threadings.

FIG. 2 is a detailed sectional view of an embodiment of the invention in a plane comprising the axis $X_2$. A protector (20) in accordance with the invention comprises a principal body (21), substantially of revolution and having an axis $X_2$, and at least one annular gasket (25). The protector (20) also comprises a wall (31), at least one threading (19) which is capable of meshing with the threading (11) of the connection (1). The protector (20) and the connection (1) are shown connected together in FIG. 2.

Since the protection is primarily mechanical, the body (21) must have a certain rigidity while being capable of at least partially absorbing shocks. To this end, the body (21) may, for example, be produced by injecting a thermoplastic material into a suitable mould. Of the various families of thermoplastic materials which may advantageously be used, particular mention may be made of blends based on polycarbonate, such as polycarbonate-polyester (PC-PBT or PC-PET) and high or ultra-high density (PE-HD, PE-UHD) polyethylenes (PE).

Appendix I of the specification API SCT, 2011 edition, lists the requirements for threading protection devices, in particular minimum values for the axial and bias (45°) shock resistance for three temperatures (−46° C., +21° C. and +66° C.).

It is more particularly possible, for example, to select a PE-HD produced by DOW and sold under the trade name DMBA-8904-NT7 or produced by BASELL and sold under the trade name LUPOLEN 4261 AG UV 6005, a PE-UHD produced by TICONA and sold under the trade name GUR 5113, or a PC-PBT produced by BAYER and sold under the trade name MAKROBLEND 57916.

The body (21) may optionally be partially (at least) formed with cells, in particular in its thick portions, in order to absorb shocks better.

The body (21) may also be strengthened by a reinforcement, for example a metal skirt, to strengthen its rigidity or improve its shock resistance.

In the embodiment of FIG. 2, the body (21) comprises a radial partition (34) forming a plug. In a variation (not shown), the radial partition (34) is provided with openings, or it might even be absent.

In the embodiment of FIG. 2, the protector (20) comprises an annular housing (22) which is capable of receiving and retaining an annular gasket (25).

The annular gasket 25 is disposed in an annular housing (22). The annular housing is defined by an annular housing bottom (24), an outer lateral wall (29a) and an inner lateral wall (29b). The annular housing comprises a free portion of the annular housing which can be used to insert the annular gasket into the annular housing.

The outer (29a) and inner (29b) lateral walls are arranged in a manner such that the annular gasket is retained in its housing. The outer (29a) and inner (29b) lateral walls respectively comprise outer (32a) and inner (32b) exterior portions of the lateral wall. The outer (29a) and inner (29b) lateral walls respectively comprise outer (33a) and inner (33b) interior portions of the lateral wall.

The outer (32a) and inner (32b) exterior portions of the lateral wall define the free portion of the annular housing and define an opening (43). The distance between the outer (32a) and inner (32b) exterior portions of the lateral wall is denoted $A_u$. The opening (43) is of width $A_u$. The widths are taken radially with respect to an axis $X_2$ of the protector. The opening can be used to insert the gasket into the housing. The width $A_u$ is selected in a manner such that the gasket can be elastically deformed as it is introduced into the housing through the opening. This opening can also be used to enable the gasket to come into contact with the distal annular surface of the connection when the protector is screwed onto said connection. The term "overall width" of an annular object means the difference between the distance from the point furthest from the annular object with respect to the centre and the point closest to the annular object with respect to the centre of the annular object, or the difference between the maximum radius and the smaller radius of the annular object.

The useful width $A_u$ of the opening is smaller than the overall width of the annular gasket A, which means that the gasket is retained in the annular housing. The risks of unintentional loss of the gasket when manipulating the protector are minimized.

The exterior portions of the outer (32a) and inner (32b) lateral wall partially surround the upper face (30) of the annular gasket.

An annular gasket (25) viewed in FIG. 3 comprises a ring (27) comprising a lower face (28), an upper face (30), an outer face (36) and an inner face (37).

The lateral walls and the housing bottom substantially follow the shape of the annular gasket (25) in order to improve retention of said gasket. Thus, the gasket does not twist during transport or when the protector is screwed onto the connection. This effect is amplified when the exterior portions of the outer (32a) and inner (32b) lateral wall partially follow the shape of the annular gasket.

In the embodiment of FIG. 2, the bottom of the annular housing is planar, which means that the forces imposed on the gasket can be distributed in a single direction and can contribute to preventing twisting of the gasket.

In a variation (not shown), the bottom of the annular housing is a toroidal portion enveloping a lower face (28) which is a corresponding toroidal portion. This means that the contact surface between the gasket and the housing bottom can be increased.

The free portion of the annular housing leaves a portion of the upper face (30) of the annular gasket free from being contacted by the distal end surface (8) of the connection (1).

The upper face (30) of the annular gasket is planar or has a slightly conical, concave or convex shape, i.e. has an elevation with a height of less than ¼ of the height of the annular gasket, taken as the mean distance separating the upper face from the lower face of the annular gasket. In the case of a conical shape, the height of the elevation is the difference in thickness between the inner face (37) and the outer face (39). In the case of a convex or concave shape, it is the difference in distance from a high point to a low portion on the lower face (28).

The annular gasket (25) does not have a circular section.

The annular gasket (25) has an overall width (A) which is larger than the width (B) of the distal end surface of the connection (1).

In particular, the annular gasket (25) has a useful surface which is the portion of the upper face (30) left free by the opening of the annular housing. This useful surface has a useful width $A_u$, i.e. the width of the opening (43), which is smaller than the overall width (A). This means that the risks of unintentional loss of the gasket during manipulation of the protector can be minimized.

The combination of a structure of the annular housing (22) comprising two outer (29a) and inner (29b) lateral walls which are separated from each other and in which an annular gasket (25) is disposed and of each lateral wall comprising a bottom lateral wall portion (33a; 33b) and an exterior portion of the lateral wall (32a, 32b) means that the risks of the annular gasket sticking to the distal end surface of the connection are minimized.

The useful width $A_u$ is larger than the width (B) of the distal end surface (8) of the connection (1). Thus, the contact surface between the distal end (8) and the annular gasket is maximized, which means that on the one hand the seal of the connection can be improved and on the other hand that it is possible to apply a larger screwing torque between the protector and the connection through the gasket, and thus the resistance to unintentional break-out of the protector can be improved.

A supplemental advantage is that the distal end surface (8) is not directly in contact with the body of the protector, thereby avoiding contacts of different natures between the protector and the distal end surface (8) of the protector. In fact, the distal end surface is not in direct contact with the housing of the protector or in contact with the body of the protector.

The annular gasket (25) is produced from a flexible material, i.e. a deformable and elastic material, i.e. which can substantially regain its initial shape. The annular gasket (25) is produced from an elastomeric material. The viscoelastic behaviour of the elastomer induces the coefficient of friction to behave in a manner which is very different compared with a solid with a high elastic modulus such as a steel or a plastic. The great flexibility of elastomers means that they can follow reliefs on the antagonist surface. The Applicant has demonstrated that it is not desirable for the distal end surface to be in heterogeneous contact with two materials, a viscoelastic material and a non-viscoelastic material, with very different behaviours, in particular from the frictional viewpoint.

Said material may offer an elongation at break of more than 200%. In this regard, it may, for example, be produced by injecting a flexible material which is resistant to corrosion, to chemical attack, in particular by industrial solvents and acids, and to prolonged exposure to UV radiation, while retaining its mechanical properties. Examples of various families of materials which may advantageously be used which may be cited are neoprene elastomers such as Baypren 210 produced by LANXESS, EPDMs (ethylene-propylene) such as Nordel from du Pont or IP Hydrocarbon Rubber produced by DOW or Vistalon Esso-Chimie, nitriles, or one of these materials disposed in a polyolefin matrix. The annular gasket (25) may be constituted by said material.

The screwing torque of the protector on the connection is composed of torque components principally exerted by the threading of the connection on the protector and by the connection surfaces on the sealing surfaces of the protector.

The component of the screwing torque of the protector on the connection obtained at the annular gasket is due to the contact force and to the frictional factor between the distal annular surface and the annular gasket and also to the frictional factor between the annular gasket and the annular housing of the protector.

FIG. 3 represents an annular gasket (25) of an embodiment of the invention which comprises a ring (27) and at least one notch (26) formed in the ring (27), which is capable of cooperating with a set-back (23) formed in the annular housing (22) of FIG. 4. This can be used to prevent rotation of the annular gasket in its housing and to obtain a screwing torque of the protector on the connection at the annular gasket which is due to the contact force between the notches. This reduces the dependency of the component of the screwing torque of the protector on the connection as regards the frictional factor of the annular gasket on the housing. This therefore means that the risks of accidental break-out can be reduced.

In a variation, the annular gasket comprises a plurality of notches (26) which can be used to cooperate with a plurality of set-backs (23) formed in the annular housing (22). This means that the annular gasket can be subjected to a higher screwing torque, the forces opposing rotation of said annular gasket being distributed over the various notches. This also means that the risks of tearing the annular gasket at a notch can be reduced.

A notch (26) has a substantially U-shaped or V-shaped contour viewed in a radial plane.

A notch (26) comprises a first notch wall (39a), a second notch wall (39b) and a linking surface between the notch walls substantially corresponding to the interior lateral wall. The notch walls (39a, 39b) are substantially planar and form an angle to the intersection with the tangent to the interior lateral wall which is between 30° and 135°. This means that the notch (26) can mesh with a corresponding set-back (23) of the annular housing (22), so that rotation of said gasket in the annular housing is prevented.

In FIG. 3, the inner face (37) of the ring (27) comprises a plurality of notches (26). Alternatively, or in a complementary manner, one or more notches may be produced on the outer face (36) of the ring. Alternatively again, or in a complementary manner, one or more notches (36) may be produced on the lower face (28) of the ring (27).

Advantageously, for embodiments of a protector for the female end, the protector is a female end protector and comprises an annular gasket with a plurality of notches formed in the outer face (36) of the ring (27) and the exterior lateral wall of the annular housing of the protector comprises corresponding set-backs.

FIG. 4 represents a protector body of one embodiment of the invention, which does not show the annular gasket (25) in order to make the figure easier to comprehend. The protector (20) comprises an annular housing (22) in which at least one set-back (23) is formed which can receive a notch (26).

This can block rotation of the annular gasket (25) in the annular housing (22) and thus block rotation of the annular gasket (25) with respect to the body of the protector. Thus, the torque applied by the distal end surface (8) when screwing onto the connection (1) is transmitted to the protector via the annular gasket. The annular gasket can lock the protector when it is screwed onto the connection and reduce the chances of accidental break-out of the protector.

In the embodiment of FIG. 4, the annular housing comprises a plurality of set-backs (23) formed in the interior lateral wall (29b) of the annular housing (22) which correspond to the plurality of notches (26) formed in the inner face (37) of the ring (27) of the annular gasket (25).

In FIG. 5, the notch walls (39a; 39b) bear on the walls of the set-backs (23a, 23b) of the annular housing. The annular gasket thus meshes with the annular housing. This means that the forces resisting the torque applied by the connection on the protector (20) can be distributed and increased through the distal end surface (8) of said connection (1).

A small clearance between the notch walls and the set-back walls may be provided in order to facilitate mounting and to compensate for dimensional changes due to expansion of the elements of the protector as a function of temperature.

In a variation (not shown), the annular housing comprises at least one recess formed in the bottom of the annular housing. This recess allows access to the annular gasket via the lower face, making its removal from the annular housing easier, for example for a gasket replacement operation, without prejudice to the quality of the seal provided by the gasket on the distal end surface of the connection.

The location of the gasket and how it is mounted on the protector means that this prevents other portions of the connection from coming into contact with the gasket, in particular the elements of the threading, and thus prevents deterioration of the gasket by said threading.

In one embodiment, the annular gasket (25) is located inside the space defined by the annular housing (22).

An annular housing (22) receiving an annular gasket (25) means that the quantity of elastomeric material used for the gasket can be restricted.

The annular gasket (25) is not in contact with the threading (11) of the protector in the mounted condition or during screwing, which means that any degradation of said gasket by protruding ridges of the threading is avoided.

The geometry of the outer (29*a*) and inner (29*b*) lateral walls means that the risks of unintentional loss of the gasket can be greatly reduced, in particular when the protector is not screwed onto the connection to be protected.

The invention claimed is:

1. A protector for a threaded tubular connection for a tubular component for drilling or operating hydrocarbon wells, provided with an annular surface of a distal end, the protector comprising:
   a principal body including at least one threading; and
   an annular housing including an annular bottom, an outer wall and an inner wall being separated from each other and in which an annular gasket is disposed, the outer wall and the inner wall each including an interior portion and an exterior portion, the exterior portions of the outer wall and the inner wall defining an opening with a width $A_u$, and wherein a distance A between the interior portions of the outer wall and the inner wall is greater than the width $A_u$, a first annular gasket being inserted and retained in the annular housing.

2. The protector according to claim 1, wherein the width $A_u$ is greater than a width B of the annular surface of the distal end, wherein when screwed on, the annular surface of the distal end is in contact with the first annular gasket only.

3. The protector according to claim 1, wherein the annular gasket includes at least one notch cooperating with at least one set-back formed in the annular housing.

4. The protector according to claim 3, wherein the notch has a V-shaped or a U-shaped contour.

5. The protector according to claim 1, wherein the annular gasket includes a plurality of notches distributed over a circumference of said annular gasket, and the annular housing includes a plurality of set-backs cooperating with said notches.

6. The protector according to claim 3, wherein the annular gasket includes an inner face, an outer face, an upper face, a lower face, and at least one notch on the inner face or on the outer face or on the lower face.

7. The protector according to claim 1, wherein the annular gasket includes an upper face having a substantially planar shape.

8. The protector according to claim 1, wherein a shape of the annular bottom is planar or is in the form of a portion of a toroid enveloping a lower face.

9. The protector according to claim 1, wherein the annular gasket is formed from an elastomeric material with a hardness in the range 30 to 60 Shore A.

10. The protector according to claim 1, wherein the annular gasket includes an upper face having a conical shape, or a concave shape, or a convex shape, wherein a distance between a highest point of the upper face and a base of the upper face is less than ¼ of a distance between the highest point of the upper face and a bottom surface of the annular gasket.

11. The threaded tubular connection component for drilling or operating hydrocarbon wells, comprising:
    at least one threading; and
    the annular surface of the distal end, said threaded tubular component being equipped with the protector according to claim 1, the protector being screwed onto said threading of said threaded tubular component.

12. The component according to claim 11, wherein the annular surface of the distal end is in contact with the annular gasket only.

* * * * *

UNITED STATES PATENT AND TRADEMARK OFFICE
CERTIFICATE OF CORRECTION

PATENT NO. : 10,107,047 B2
APPLICATION NO. : 15/536717
DATED : October 23, 2018
INVENTOR(S) : Jose Antonio Aguilar Mendez et al.

Page 1 of 1

It is certified that error appears in the above-identified patent and that said Letters Patent is hereby corrected as shown below:

In the Specification

Column 7, Line 24, change "specification API SCT" to --specification API 5CT--; and Column 7, Line 35, change "MAKROBLEND 57916" to --MAKROBLEND S7916--.

Signed and Sealed this
Twenty-second Day of October, 2019

Andrei Iancu
*Director of the United States Patent and Trademark Office*